United States Patent [19]

Oppmann et al.

[11] 3,999,374
[45] Dec. 28, 1976

[54] AUTOMOTIVE GAS TURBINE CONTROL

[75] Inventors: Richard C. Oppmann; Larry L. Schwartz, both of Kokomo, Ind.

[73] Assignee: General Motors Corporation, Detroit, Mich.

[22] Filed: July 11, 1975

[21] Appl. No.: 595,024

[52] U.S. Cl. .................. 60/39.16 R; 60/39.28 R
[51] Int. Cl.$^2$ ................ F02C 3/10; F02C 9/04
[58] Field of Search ............ 60/39.16 R, 39.16 S, 60/39.16 C, 39.33, 39.2

[56] References Cited
UNITED STATES PATENTS

| | | | |
|---|---|---|---|
| 3,050,941 | 8/1962 | Rogers | 60/39.16 R |
| 3,439,496 | 4/1969 | Bevers | 60/39.16 R |
| 3,733,815 | 5/1973 | Kanol | 60/39.16 R |

*Primary Examiner*—Carlton R. Croyle
*Assistant Examiner*—L. J. Casanegola
*Attorney, Agent, or Firm*—Paul Fitzpatrick

[57] ABSTRACT

A gas turbine power plant, particularly adapted for powering motor vehicles. The engine includes a gas generator made up of a compressor, combustion apparatus, and a turbine driving the compressor. It also includes a power turbine energized by the flow from the gas generator rotatable independently of the gas generator. The power turbine is connected through a suitable transmission to the driving wheels of the vehicle and also drives accessory loads such as the engine fuel and oil pumps, an alternator, air conditioning, a power steering pump, and the like in the vehicle. The gas generator is substantially free of any accessory drive load, which improves the acceleration characteristics of the engine.

The engine fuel control includes an underspeed governor which responds to power turbine speed and increases fuel flow as required to maintain power turbine speed at a minimum value high enough to power the accessory devices satisfactorily. A vehicle operator's engine speed request from an accelerator pedal is added to the underspeed governor output signal for operation above idle. The fuel flow to the engine is limited by a function of engine inlet air temperature and power turbine speed to limit power turbine torque so as not to overload the transmission.

2 Claims, 3 Drawing Figures

AUTOMOTIVE GAS TURBINE CONTROL

This invention relates to gas turbine engines of a gas-coupled type and to fuel control systems for such engines. According to the invention, all or substantially all accessory loads are taken from the power turbine of the engine which drives the vehicle wheels, and the gas generator turbine which rotates independently of the power turbine is free from accessory loads. The fuel control of the engine responds to power turbine speed to control fuel flow to the gas generator so as to maintain a minimum power turbine speed suitable for driving the accessories under engine idling conditions.

The fuel control includes means responsive to the power turbine speed which acts as an underspeed governor on the gas generator turbine, varying the speed level as is necessary to maintain the required minimum power turbine speed. To get increased power from the power turbine, the gas generator speed is increased by adding an operator's gas generator speed or power signal to the minimum signal transmitted from the underspeed governor.

The control also includes means responsive to engine operating conditions to limit power gas generator fuel so as to prevent excessive torque in the power turbine output shaft.

Gas turbine engines to provide shaft power output at varying speeds ordinarily are of the two shaft or gas-coupled type. The compressor of the engine supplies air to a combustion apparatus which delivers motive fluid to a gas generator turbine which drives the compressor. The gas generator turbine takes only part of the available energy from the motive fluid and exhausts into a power turbine which drives the power output shaft of the engine, and which rotates independently of the gas generator turbine.

It is also possible to use a single-shaft engine, in which a single turbine drives both the compressor and the power output shaft; but this type is not generally well regarded for driving vehicles. The principal reason for this is that a gas generator ordinarily has a minimum idling speed of the order of 40 to 50 percent of its maximum rated speed. In a single-shaft engine, the minimum speed of the power output shaft therefore is near half the maximum speed.

On the other hand, with a gas-coupled engine, it is possible to bring the speed of the output shaft down to zero while the gas generator continues to run, and output torque characteristics are more favorable. It is common practice in gas-coupled engines to have two power takeoffs for accessory drive purposes. Accessories such as fuel and lubricating oil pumps or other devices such as rotary regenerators which must be continually in operation are driven from the gas generator, whereas other accessories such as an air conditioning compressor or an alternator for charging the vehicle's battery are driven from the power turbine. In addition to complication in the engine and the accessory drive gearboxes, this division of accessory loads is inimical to most favorable acceleration characteristics of the engine. One of the handicaps that the gas turbine engine has, as compared to common internal combustion engines, is a slower response to a requirement for full power such as may occur when the vehicle operator accelerates from a standstill or from a slow vehicle speed. The reason for this lies principally in the fact that the gas generator may require about a second to accelerate from idle to full speed and power, and the power turbine does not deliver much torque until the gas generator is near full speed.

An important point of our invention is that these accessory loads are taken off the gas generator, which helps vehicle acceleration in two respects. First, the absence of accessory loads makes the entire power output of the gate generator available to accelerate the gas generator turbine and compressor rotors. Secondly, the gas generator rotor and the rotating parts driven by it may have a lower moment of inertia, which aids acceleration.

Also, since engine idle is controlled to as low a value as is sufficient for accessory drive, idling fuel consumption and noise are decreased. Moreover, engine braking is improved and vehicle creep is reduced.

The stumbling block to driving engine and vehicle accessories from the power turbine has been the wide speed range of the power turbine. According to this invention, this is overcome by maintaining power turbine speed always just high enough to drive the loads properly. This is accomplished by means responsive to power turbine speed which provides an input to the gas generator fuel control to increase fuel as the accessory load on the power turbine rises, so as to maintain the desired power turbine speed.

The control system also includes other elements to prevent overspeed or overtemperature of the engine and to limit the torque output of the power turbine as a means of preventing overloading of the transmission under some operating conditions.

The principal objects of the invention are to provide a gas turbine engine best suited to vehicle propulsion and service, an engine in which accessory loads are driven from the power turbine and the gas generator is relieved of such loads; to provide a gas-coupled gas turbine engine having superior acceleration characteristics; and to provide a gas generator fuel control which responds to power turbine speed to maintain a desired minimum power turbine speed under varying loads on the power turbine. Further objects of the invention are to provide a control for a gas generator which responds to power turbine underspeed and to a power output request from the vehicle operator as a basic element in control of fuel flow to the gas generator. Further objects are to provide other correcting and limiting controls to provide for safe operation and to maximize the operating characteristics of a gas-coupled gas turbine engine.

The nature of the invention and its advantages will be clear to those skilled in the art from the succeeding detailed description of the preferred embodiment of the invention, the accompanying drawings, and the appended claims.

Referring to the drawings.

Figure 1:
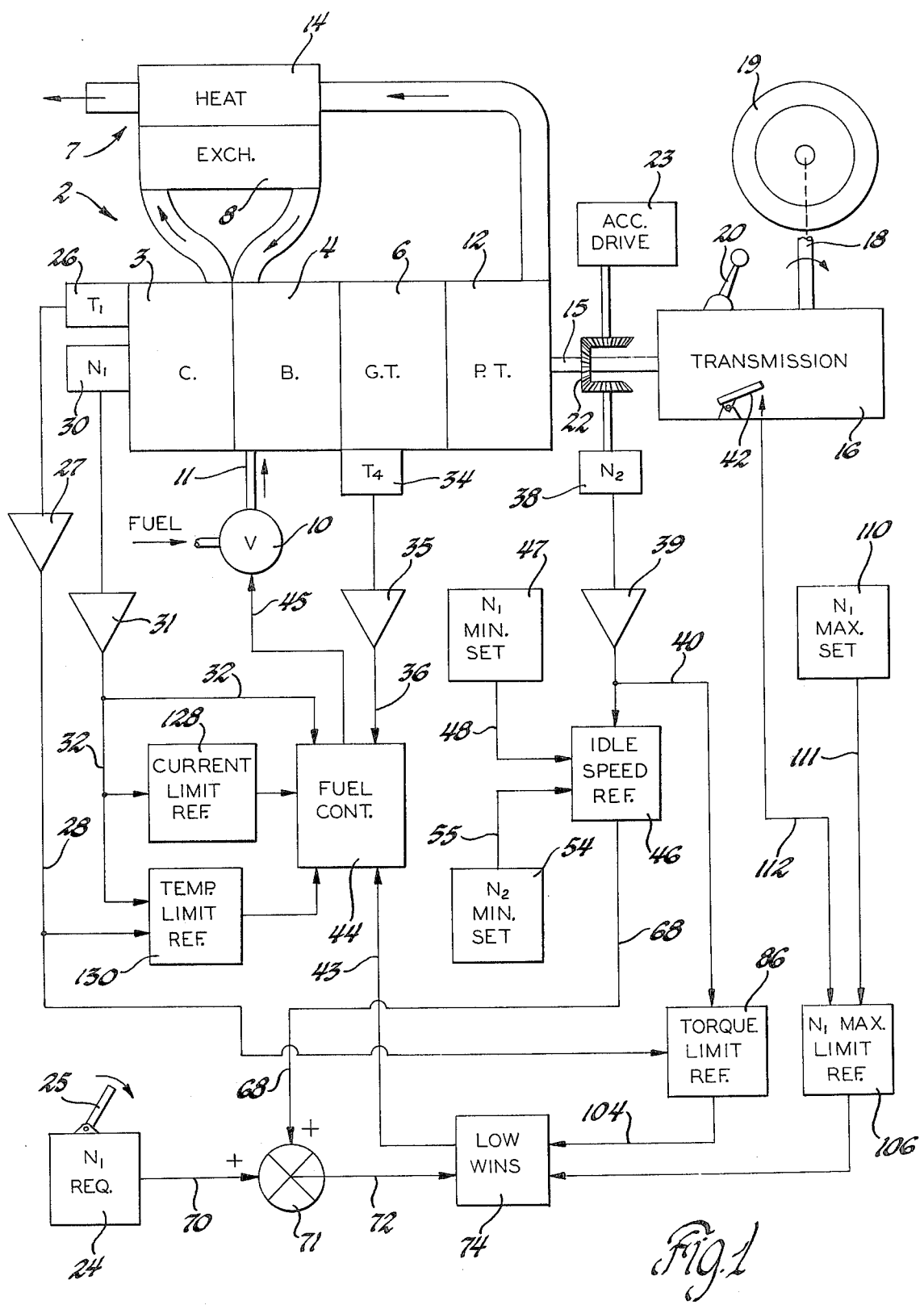
FIG. 1 is a schematic diagram of a gas turbine power plant including a gas-coupled engine and a fuel control for the engine.

Referring first to FIG. 1, the power plant illustrated includes a gas-coupled gas turbine engine 2 comprising a compressor 3, a combustion apparatus or burner 4, and a gas generator or high pressure turbine 6. Turbine 6 is connected by shafting to compressor 3 to drive it. The compressor takes in atmospheric air, compresses it, and supplies it to the combustion apparatus through a pass 8 of a regenerator or heat exchanger 7. Fuel is supplied to the combustion apparatus from a suitable source such as an engine-driven pump (not illustrated) through a fuel controlling or fuel metering valve 10 and an engine fuel line 11. The combustion products resulting from burning the fuel energize the turbine 6 and the exhaust of turbine 6 energizes an independently rotatable power turbine 12. This turbine exhausts through the second pass 14 of the regenerator 7 to atmosphere. The heat exchanger cools the exhaust gases and correspondingly heats the compressed air flowing into the combustion apparatus. While a regenerator is not essential to our invention, it is considered to be necessary for good fuel economy of the engine.

The power turbine drives an output shaft 15 leading to a transmission 16 which in turn drives a propeller shaft 18 leading to the driving wheels 19 of the vehicle.

Details of the engine and transmission need not be described, since these may follow known practice. The transmission must include some form of clutch or other device which allows the shaft 15 to rotate when the wheels are stationary. This might be a releasable clutch, a slipping clutch, a fluid flywheel, or most likely a torque converter, since a torque converter seems most desirable for best operating characteristics of the vehicle. The transmission may also, as is usual, include forward drive gears of several ratios and a reverse drive gear. The transmission should also include a neutral position in which no power is transmitted to the rear wheels and preferably a park position in which the propeller shaft is locked. These are conventional in automotive transmissions. The transmission may be controlled by a lever 20 movable to select park, reverse, neutral, and drive conditions of the transmission.

The power turbine shaft 15 is coupled through a suitable train of gearing indicated at 22 to engine and vehicle accessories indicated at 23. These may include an engine lubricating oil pump, a fuel pump, a rotary regenerator, an alternator to provide electricity to the vehicle, a power steering pump, an air conditioning compressor, and any other devices for engine or vehicle service which are ordinarily or desirably driven by the engine. Preferably, the gas generator drives no accessory devices other than a tachometer or speed transducer for engine control. This may be a toothed wheel generator, for example.

Since the power turbine rotates constantly when the engine is in operation, the fuel and oil necessary for operation of the engine may be pumped by the power turbine. For starting, the engine may operate without lubrication for the few seconds required to start the gas generator and energize the power turbine sufficiently. The fuel pump may be connected through an overrunning clutch arrangement to both the power turbine and the usual engine starter (not illustrated) which is coupled to the gas generator turbine for starting the engine. Alternatively, it is possible to provide fuel for starting the engine from an accumulator.

The power level of the engine is controlled by the vehicle operator through a suitable power request input 25 which may be the usual foot throttle or accelerator pedal of the vehicle. Ordinarily in gas turbine controls, such an input sets the speed or temperature level of the gas generator subject to limiting overrides. In this control the input 25 actuates an $N_1$ request transmitter 24 which transmits a signal of desired gas generator speed.

The control includes four transducers or transmitters which provide signals indicative of conditions of engine operation. A $T_1$ transmitter 26 responds to engine inlet air temperature and provides a signal of engine inlet air temperature or $T_1$ through a suitable amplifier 27 to a line 28. The gas generator turbine speed is indicated by an $N_1$ transducer 30 which may be a suitable electronic or other tachometer and which may include an amplifier 31 to delivery a potential proportional to gas generator speed to a line 32. Gas generator turbine inlet temperature identified as $T_4$ is measured by a thermocouple or other suitable sensitive means 34 disposed in the path of flow from the combustion apparatus into the turbine 6. This temperature measuring device ordinarily includes an amplifier 35 which should include compensation for thermocouple temperature lag, as is well understood by those skilled in the art. The instantaneous or corrected turbine inlet temperature, hereafter referred to as TIT, is represented by an electrical potential signal on a line 36. Power turbine speed $N_2$ is sensed by a pickup or tachometer 38 which may supply a potential signal proportional to power turbine speed through a suitable amplifier 39 to a power turbine speed signal line 40. A final input to the control system is from a switch 42 in the transmission which is open when the transmission is in a non-driving condition such as park or neutral and is closed when the transmission is in a driving condition such as drive or reverse.

Proceeding now into the nature of the control of fuel to the engine, the basic signal which determines fuel flow to the engine is a gas generator speed signal fed to the fuel control 44 through a line 43. The fuel control includes means to compare this with the actual gas generator speed signal on line 32 and increase or decrease fuel according to the magnitude and direction of the speed error. For transient conditions such as acceleration or deceleration, there are other considerations which may be mentioned later.

For the present, let us assume that the fuel supply to the engine is controlled in response to the speed error to maintain gas generator speed at a desired value, the control being exercised by transmission of a signal through a fuel control line 45 from the fuel control 44 to the fuel metering valve 10. It will be appreciated, of course, that the valve 10 may be an integral part of the fuel control and that control line 45 might be a mechanical linkage as well as a hydraulic or electrical signal transmission means.

We may now proceed to the way in which the basic $N_1$ request of the vehicle operator is modified to provide the speed signal on line 43. In this connection, attention should also be directed to FIG. 2. In describing the electrical circuits of FIG. 2, the values and identification of certain components are included for completeness of disclosure and to facilitate practice of the invention. It is to be understood that such values may be modified to suit a particular requirement or the preferences of the designer of an electronic circuit for a particular engine, and may be changed as the electronic arts progress. The control is energized from a positive bus at 10 volts D.C.

It may be pointed out that the gas generator signal on line 43 is based upon the lowest of three signals. First of these is the sum of an idle speed reference signal which is responsive to power turbine speed and which acts to keep gas generator speed high enough to maintain the desired minimum power turbine speed and the speed request from the vehicle operator to drive the gas generator above this idle condition for greater power output. The second signal is one based upon engine inlet temperature and power turbine speed to prevent overtorqueing the transmission. Thirdly, the $N_1$ maximum is varied by a circuit controlled by transmission switch 42 to limit gas generator speed to a desired limit such as 65 percent maximum and thus limit torque delivered to the transmission when the transmission is disengaged.

Figure 2:
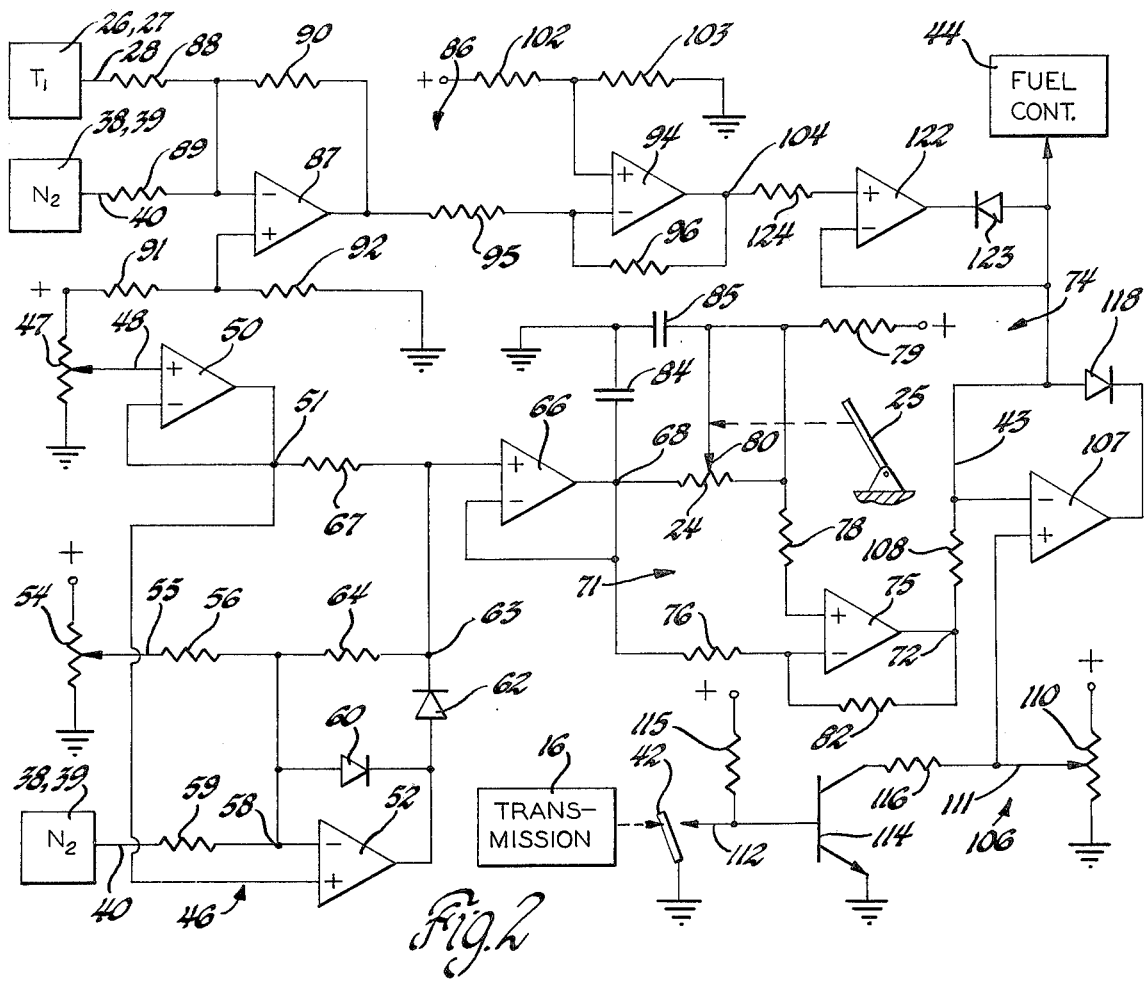
FIG. 2 is a wiring diagram of portions of the control of FIG. 1.

Considering first the idle gasifier speed reference, this signal is generated in a circuit 46 which is diagrammed in FIG. 2. The circuit 46 has an input on line 40 from the $N_2$ signal generator 38, 39. Specifically, this signal is proportional to $N_2$ and equals 6.45 volts D.C. at 100 percent rated $N_2$. It receives an input representing minimum gas generator speed from a 1000 ohm potentiometer 47 which is set to prevent gas generator speed from going below a minimum self-sustaining speed (for example, 32 percent maximum rated) notwithstanding the value of power turbine speed. Potentiometer 47 is coupled through a line 48 to the plus input of an operational amplifier 50 which acts as a voltage follower. The output of this amplifier is connected through junction 51 to the minus input of the amplifier and to the plus input of an operational amplifier 52. The idle speed reference circuit also includes a 10 kilohm potentiometer 54 by which an absolute minimum value of $N_2$, regardless of load, is set. This may be about 18 percent of maximum rated $N_2$. The slider of potentiometer 54 is connected through line 55 and an 82 kilohm resistor 56 to the minus input of amplifier 52 (junction 58). The potential on line 40 representing the actual value of $N_2$ is fed to this input through a 10 kilohm resistor 59.

The output of operational amplifier 52 is connected to junction 58 through a diode 60 which is reverse biased when the output is positive with respect to junction 58. There is also a circuit from the operational amplifier output through a diode 62, junction 63, and an 82 kilohm resistor 64 to junction 58. Diode 62 is forward biased when the amplifier output potential is above that at the minus input 58. Resistors 56 and 64 are of the same value so as to maintain unity gain for the power turbine minimum speed set point set by potentiometer 54. Juntion 63 is connected to the plus input of an operational amplifier 66 which is connected to operate as a voltage follower to drive output line 68. This input also is connected to the output of amplifier 50 by a 100 kilohm resistor 67.

The circuit elements just described generates the signal for governing the gas generator turbine to maintain the desired minimum power turbine speed. The potential on the plus input of amplifier 52 is constant representing the gas generator minimum speed setting. The potential on the minus input at 58 is a function of actual power turbine speed supplied through resistor 59, power turbine minimum speed setting established on potentiometer 54, and the feedback from the amplifier through the network 60, 62, 64.

Operational amplifier 52 provides a signal to increase gas generator speed, and thus indirectly the speed of the power turbine, if power turbine speed drops below the minimum desired value. Amplifier 66 has high input impedance so, in the absence of a signal from operational amplifier 52, the input to this amplifier is the potential set on potentiometer 47 supplied through resistor 67, holding the gas generator speed in the particular embodiment at 14,000 rpm. Potentiometer 54 is set to tap a value such as to provide an output from amplifier 52 to increase gas generator speed whenever power turbine speed drops below the desired minimum value. To this end the potential taken off potentiometer 54 is as far above the potential taken off potentiometer 47 as the voltage on line 40 corresponding to the minimum power turbine speed is below it.

With this setting, the amplifier 52 operates as follows: When power turbine speed is above the minimum, diode 60 is forward biased, diode 62 is reversed biased, and there is no current through resistor 64. Therefore, there is negligible voltage drop in resistor 67 feeding into the high impedance to the amplifier and the amplifier input is the voltage tapped off potentiometer 47, the gas generator minimum setting. Thus, when $N_2$ is at or above the minimum level, amplifier 52 has no effect on the input to amplifier 66.

However, if the power turbine speed decreases to a level below the setting of $N_2$ minimum, diode 60 becomes reverse biased and diode 62 becomes forward biased. The gain of amplifier 52 with respect to power turbine speed thus becomes a function of the value of resistor 64 over resistor 59 or 4.1. With the particular circuit shown, the idle gasifier speed reference signal on junction 63 and the input to the operational amplifier 66 increase proportionally to the decrease of $N_2$ below the set point. With the gain of amplifier 52 as set, the gas generator speed will increase approximately 4½ percent of maximum rated speed for each 1 percent of maximum power turbine speed decrease of power turbine speed below the minimum speed. Operational amplifier 66 thus transmits to its output line 68 a signal which holds the gas generator idling speed to a value high enough to maintain the minimum power turbine speed.

As shown symbolically on FIG. 1, the idle speed reference signal on line 68 has the gas generator speed request from the foot pedal 25 and transducer 24 added to it. This signal specifically is 7 volts D.C. for 100 percent rated gas generator speed and is directly proportional to speed request. The $N_1$ request signal is supplied through a line 70 to an adding device 71 and the sum is transmitted through a line 72 to a circuit 74 amounting to a Low Wins gate. The Low Wins gate provides for reduction or overriding of the gas generator speed signal by limiting signals to be described.

Referring to the wiring diagram of FIG. 2, the adding circuit 71 comprises an operational amplifier 75 which receives the signals from line 68 and from a variable resistor 24 which is the transducer of position of the foot pedal 25. The resistance of 24 is variable from 0 to 650 ohms. The minimum speed potential on line 68 is transmitted through a 10 kilohm resistor 76 to the minus input of amplifier 75. Line 68 is also connected through variable resistor 24 and a 10 kilohm resistor 78 to the plus input of amplifier 75. The output of 75 is connected to the minus input through a 27 kilohm resistor 82. The output of amplifier 75 on line 72 is thus an amplified value of the difference between the plus and minus inputs to amplifier 75. The minus input is taken directly from line 68 through the 10 kilohm resistor 76 and the plus input through the variable resistor 24. Flow through a biasing register 79 (2610 ohm) creates a potential drop in register 24 which varies from zero upward as its resistance increases from zero. The values of the biasing resistor 79 and variable resistor 24, and the gain of amplifier 75 are chosen so that at maximum power demand setting the output potential of amplifier 75 is at least able to reach 7 volts D.C.

corresponding to 100 percent gas generator speed with the lowest possible idle speed reference signal. Capacitors 84 and 85 provide noise immunity to the circuit extending to resistor 24, which is remote from the electronic control package. If the idle speed reference signal increases, less throttle movement is required to reach 100 percent gas generator speed. Thus the signal on line 72 calls for the gas generator speed required to power the power turbine at its minimum acceptable speed plus any additional called for by the vehicle operator up to full power.

Figure 3:
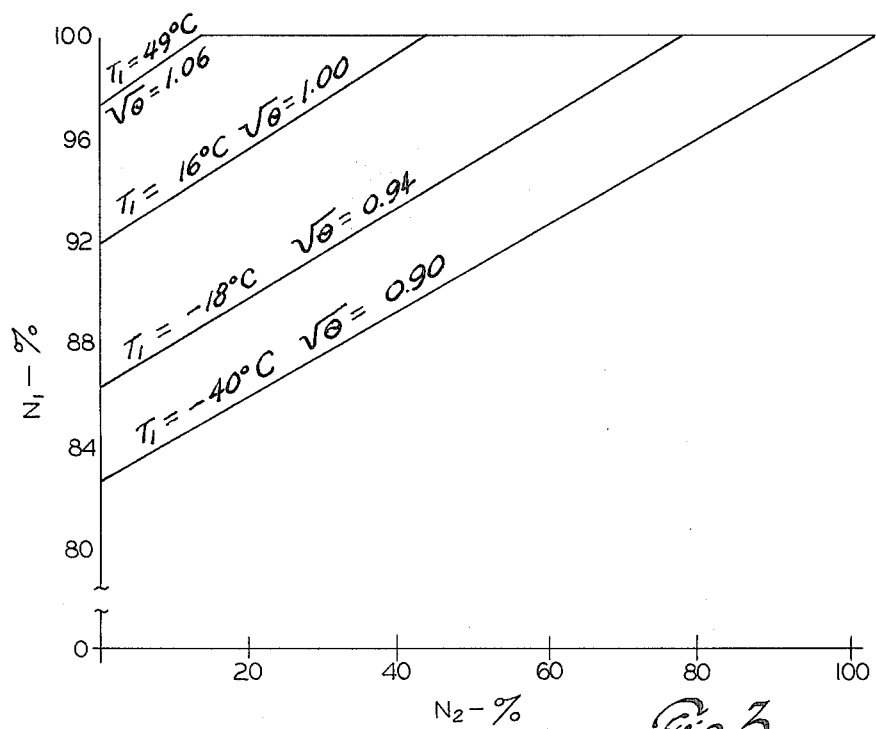
FIG. 3 is a plot of gas generator maximum speed limits as a function of power turbine speed and engine inlet air temperature.

This signal is limited in the Low Wins circuit 74 by two limit signals the first of which is a torque limiting signal provided to limit the gas power delivered to the power turbine so that it will not provide a torque output heavy enough to overload the transmission. The torque of a power turbine in a gas-coupled engine is a function of the energy received by it and of the power turbine speed. Energy received by it for any given gas generator speed is a function of engine inlet temperature, increasing as inlet temperature decreases. Also, power turbine torque increases as speed decreases down to a stalled condition. With the particular engine and transmission for which the particular control being described is provided, it is found that a suitable limitation of torque can be obtained by limiting gas generator speed to a value which is a linear function of power turbine speed and of engine inlet temperature and which increases with increasing speed and temperature. The relation is plotted in FIG. 3. $\theta$ is the ratio of absolute temperature to standard atmospheric absolute temperature.

The torque limit reference circuit indicated as 86 on FIGS. 1 and 2 comprises an operational amplifier 87. The minus input of this amplifier is supplied with a $T_1$ signal which increases linearly with $T_1$ from line 28 through a 14.7 kilohm resistor 88. Specifically in the case described, the $T_1$ signal equals $5.248 + 0.0167\, T_1$ volts, where $T_1$ is in degrees Celsius. The potential signal representing $N_2$ (previously described) is supplied to the same input through line 40 and a 49.9 kilohm resistor 89. A feedback resistor 90 of 10 kilohms is provided. The plus input of the amplifier is energized through a voltage divider comprising 8.87 kilohm resistor 91 and 10 kilohm resistor 92 connected between the plus supply and ground. This provides a fixed potential on the plus input of the amplifier. The output of amplifier 87 thus varies linearly with $T_1$ and with $N_2$, the gain and relative effect being set by the values of resistors 88, 89, and 90.

This output is fed through a unity gain inverter comprising operational amplifier 94. The signal from amplifier 87 is fed to the minus input of amplifier 94 through a 10 kilohm resistor 95 and the feedback resistor 96 is also 10 kilohm, thus unity gain. The plus input is fed a fixed potential by a voltage divider comprising resistor 102 (5.76 kilohm) and 103 (10 kilohm) connected between the power supply and ground. The output of amplifier 94 on line 104 is the voltage equivalent of the schedule of FIG. 3; that is, 7 volts represents 100 percent rated gas generator speed. This output is reduced by decreasing inlet air temperature and by decreasing power turbine speed. This potential is transmitted through line 104 to the Low Wins circuit 74.

The final input to the Low Wins circuit 74 is one which provides a normal 100 percent limit on gas generator speed except when the transmission is set to a non-driving position such as park or neutral, in which case the gas generator maximum speed is reduced, in this particular case to 65 percent rated. This prevents over-energizing the power turbine and thereby overloading the transmission, which has a torque limit in park and neutral. The $N_1$ maximum limit reference circuit 106 includes an operational amplifier 107 which receives the gas generator speed signal from line 72 through a 330 ohm resistor 108 on its minus input. Resistor 108 couples line 72 to the speed signal line 43 running to the fuel control. It transmits the signal, but allows it to be pulled down by the torque limiting and gas generator maximum speed signals. The plus input of amplifier 107 receives a settable potential from a tap of a 20 kilohm potentiometer 110 connected between positive and ground. This potential is set to the nominal 7 volts representing 100 percent gas generator speed and may be adjusted as necessary. Amplifier 107 forms one element of the Low Wins indicated by the numeral 74 on FIG. 1. It acts to transmit the signal on line 72 unchanged or to pull it down in response to the $N_1$ maximum limit reference signal on line 111 from the $N_1$ maximum setting potentiometer 110 or a reduced signal made operative by the transmission switch 42. Moving the transmission selector to park or neutral opens switch 42. This switch is connected through a line 112 to the base of an NPN transistor 114. The base is also connected to the positive supply through a 20 kilohm resistor 115. The emitter of the transistor is grounded and its collector is connected to line 111 through a 6.65 kilohm resistor 116. When switch 42 is closed the transistor is nonconducting and the potential on line 111 is the 7 volt tapped off potentiometer 110. When the switch is closed, the transistor becomes conducting and the current flow through resistor 116 to ground pulls the voltage on line 111 down to a voltage corresponding to the desired speed limit of the gas generator with the transmission not engaged, which, as pointed out, is 65 percent rated speed.

The output terminal of amplifier 107 is connected to line 43 through a diode 118 which is reverse biased in the direction from output to minus input. Thus, if the signal on line 111 is less than on line 43, a current will flow through the diode pulling down the potential on line 43 and causing a potential drop in resistor 108. Thus the potential on line 43 cannot exceed the 100 or 65 percent signal received on line 111. Thus effectively the lower of the two signals is transmitted through line 43 unless limited by a further circuit in which the gas generator speed reference signal may be limited by the torque limit reference signal present on line 104. This circuit, which constitutes the second part of the Low Wins circuit 74, comprises an operational amplifier 122 having its minus input connected to line 43 and having its output connected to a diode 123 reverse biased when the output potential is higher than the minus input. The plus input of this amplifier is supplied from line 104 through a 2 kilohm resistor 124.

In the same manner as with the amplifier 107, amplifier 122 can reduce the signal on line 43 to the fuel control by causing a drop through resistor 108. Thus, the signal to the fuel control is the lowest one of the three signals; the idle speed plus $N_1$ request reference signal, the torque limit reference signal, or the gas generator idle reference signal.

The elements not so far referred to on FIG. 1 are additional inputs to the fuel control, or could be considered as part of the fuel control. A current limit reference circuit 128 responsive to gas generator speed limits fuel flow during acceleration. A temperature limit reference circuit 130 limits fuel flow as a function of both gas generator speed and engine inlet air temperature. Details of these are immaterial to an understanding of this invention.

The nature and operation of the control systems of the invention should be apparent from the foregoing. It has the important advantage of providing for proper driving of engine and vehicle accessories from the power turbine, eliminating such loads on the gas generator, and assuring adequate speed of the power turbine to accomplish this result. It also provides a torque limiter which is highly valuable in eliminating the necessity of beefing up a transmission to take high values of torque which may occur only at low ambient temperatures and low power turbine speeds.

The detailed description of the preferred embodiment of the invention for the purpose of explaining the principles thereof is not to be considered as limiting or restricting the invention, since many modifications may be made by the excerise of skill in the art.

We claim:

1. A gas generator speed reference signal generating circuit for a fuel control for a gas-coupled gas turbine engine, the circuit comprising, in combination, a gas generator idle speed reference circuit providing an idle speed signal with a datum value corresponding to minimum desired gas generator speed and including means responsive to power turbine speed effective to vary the signal from the datum so as to increase gas generator speed when power turbine speed falls below a predetermined value suitable for driving accessories from the power turbine so as to hold power turbine speed near the said predetermined value under idling conditions; operator-controlled input means providing a variable gas generator speed request signal of sufficient range to regulate gas generator speed from idle to maximum rated; means operative to add the speed request signal to the idle speed signal to provide a speed reference signal; means for limiting the speed reference signal as a function of engine inlet air temperature and power turbine speed to limit power turbine torque; and means responsive to the speed reference signal and to gas generator speed for controlling fuel flow to the engine.

2. A gas generator speed reference signal generating circuit for a fuel control for a gas-coupled gas turbine engine, the circuit comprising, in combination, a gas generator idle speed reference circuit providing an idle speed signal with a datum value corresponding to minimum desired gas generator speed and including means responsive to power turbine speed effective to vary the signal from the datum so as to increase gas generator speed when power turbine speed falls below a predetermined value suitable for driving accessories from the power turbine so as to hold power turbine speed near the said predetermined value under idling conditions; operator-controlled input means providing a variable gas generator speed request signal of sufficient range to regulate gas generator speed from idle to maximum rated; means operative to add the speed request signal to the idle speed signal to provide a speed reference signal; means responsive to the speed reference signal and to gas generator speed for controlling fuel flow to the engine; means for coupling the power turbine releasably to a driven load; and means responsive to the coupling means connected to the fuel flow controlling means so as to limit gas generator maximum speed below normal rated speed when the coupling means is released.

* * * * *